(12) United States Patent
Perplies

(10) Patent No.: US 7,578,458 B2
(45) Date of Patent: Aug. 25, 2009

(54) METHOD AND DEVICE FOR GRINDING CELLULOSE

(75) Inventor: Eberhard Perplies, Walluf (DE)

(73) Assignee: SE Tylose GmbH & Co., KG, Wiesbaden (DE)

( * ) Notice: Subject to any disclaimer, the term of this patent is extended or adjusted under 35 U.S.C. 154(b) by 247 days.

(21) Appl. No.: 11/547,222

(22) PCT Filed: Apr. 21, 2005

(86) PCT No.: PCT/EP2005/004269

§ 371 (c)(1),
(2), (4) Date: Oct. 2, 2006

(87) PCT Pub. No.: WO2005/105900

PCT Pub. Date: Nov. 10, 2005

(65) Prior Publication Data

US 2008/0053631 A1   Mar. 6, 2008

(30) Foreign Application Priority Data

Apr. 28, 2004 (DE) .................. 10 2004 020 686

(51) Int. Cl.
*B02C 19/00* (2006.01)

(52) U.S. Cl. .................. 241/15; 241/18; 241/24.19; 241/24.29; 241/23; 241/57; 241/62; 241/65; 241/79

(58) Field of Classification Search .................. 241/62, 241/15, 16, 21, 57, 18, 79, 24.19, 24.29, 241/23, 65
See application file for complete search history.

(56) References Cited

U.S. PATENT DOCUMENTS

| | | | | |
|---|---|---|---|---|
| 2,152,901 A | * | 4/1939 | Manning | 156/62.4 |
| 3,646,855 A | * | 3/1972 | Muller | 493/43 |
| 6,880,772 B2 | * | 4/2005 | Schlesiger et al. | 241/23 |

FOREIGN PATENT DOCUMENTS

| | | |
|---|---|---|
| DE | 14 11 892 A2 | 10/1968 |
| DE | 1 454 824 | 7/1969 |
| DE | 24 58 998 A1 | 12/1974 |
| DE | 24 10 789 | 9/1975 |
| DE | 196 41 781 A1 | 4/1998 |
| DE | 0 952 264 T1 | 4/2000 |
| EP | 0 049 815 A2 | 4/1982 |
| EP | 1 162 003 | 12/2001 |

* cited by examiner

*Primary Examiner*—Mark Rosenbaum
(74) *Attorney, Agent, or Firm*—ProPat, L.L.C.

(57) ABSTRACT

Disclosed are a method and a device for grinding cellulose, in which a raw cellulose material (6) is uniformly moistened with a given quantity of liquid by means of a moistening unit (1) before being ground in a grinding mill (2). A first conveying mechanism (3) conveys the raw cellulose material (6) to the moistening unit (1) while a second conveying mechanism (4) conveys the moist raw cellulose material on the grinding mill (2).

12 Claims, 6 Drawing Sheets

METHOD AND DEVICE FOR GRINDING CELLULOSE

CROSS-REFERENCE TO RELATED APPLICATIONS

This application is being filed under Rule 1.37 1 as a National Stage application of pending International application No. PCT/EP2005/004269, filed Apr. 21, 2005, which claims priority to the following parent application: German patent application No. 10 2004 020686.4, filed Apr. 28, 2004. Both International application No. PCT/EP2005/1004269 and German Patent application No. 10 2004 020686.4 are hereby incorporated by reference herein in their entirety.

FIELD OF THE INVENTION

The invention relates to a method for the grinding of cellulose in which a raw cellulose material is uniformly moistened with a prescribed amount of liquid before the grinding operation and a device for carrying out the process.

BACKGROUND OF THE INVENTION

For almost all industrial applications it is necessary to prepare cellulose and cellulose ethers in the form of powder. In this context it is necessary, depending upon the specific application, to define the granule size distribution, the dry weight and, in particular, the viscosity of the cellulose- and cellulose-ether powders.

It is known that raw cellulose material which exists for example in the form of a web can be comminuted in cutting mills to a pourable coarse cellulose powder consisting substantially of individual fibers where the fiber length distribution is significantly greater than 300 μm. The coarse cellulose powder is converted in a chemical process to cellulose ethers. If necessary, the resulting cellulose ethers can similarly be ground in a ball or vibrating mill to fine powders having a granule size distribution of less than 100 μm. For other applications it is possible to grind the coarse cellulose powder to a fine cellulose powder in ball or vibration grinding mills.

During the grinding of the cellulose or cellulose ethers the mechanical energy of grinding is to a large extent converted by friction into heat energy which leads to a rise in temperature in the mill and the sieve unit. A large part of the energy is removed by air cooling. However, it is not possible to prevent the mill heating up to a temperature of 130° C. during the grinding process. As a result of the mechanical effects at an elevated temperature the cellulose-polymer molecules are partially degraded or shortened, i.e. there is a reduction in the degree of polymerization DP.

The quality of the cellulose and cellulose ethers is characterized by their viscosity levels. In essence, the viscosity is determined by the degree of polymerization DP. A number of standardized methods are available for the measurement of viscosity which produce results which differ from one another. For the cellulose used in the process according to the invention the viscosity or rather the limiting viscosity number LVN is measured by the Cuen method described in DIN 54270. This involves the cellulose being dissolved in copper-ethylenediamine at different concentrations, measurement of the relevant viscosity levels and extrapolation to zero concentration.

In principle there is great interest in grinding processes—particularly in respect of the coarse grinding of cellulose—in the course of which the degree of polymerization DP is reduced by the least possible extent.

DE 24 58 998 (=U.S. Pat. No. 4,076,935) teaches a process for the gentle fine grinding of cellulose or its ether derivatives in a vibrating mill in the presence of 5 to 14% by weight of water either already present in the starting material or added from an external source to a powder which has a granule size distribution of less than 100 μm and a residual moisture content of 2 to 10% by weight.

In DE-A 196 41 781 a process is described for the simultaneous grinding and drying of a moist material containing cellulose ether where a gas stream feeds the material into the grinding and friction space of a mill where the initial moisture content of the cellulose ether amounts to 20 to 70% and the residual moisture after the grinding and drying operation amounts to 1 to 10% by weight.

From DE-C 952 264 a three-stage process is known for converting moist, fibrous methylcellulose into powder which dissolves rapidly. In this context the product containing 50 to 70% by weight of water is first homogenized to a plastic mass, cooled to 10 to 20° C. in a refrigerated screw press and finally ground in a hammer basket mill followed by drying in a circulating air dryer.

DE-C24 10 789 (=U.S. Pat. No. 4,044,198) describes a process for the manufacture of cellulose derivatives, preferably cellulose ethers, with a high content of fine particles. Here, the moist cellulose derivatives are embrittled with liquid nitrogen and then subjected to grinding.

In EP-A 0049 815 (=U.S. Pat. No. 4,415,124) a two-stage process for the manufacture of micro-powders of cellulose ethers or cellulose is described, where the products which exhibit a fine-fibered or wool-like structure are first converted into a brittle solid form which is subjected to grinding treatment until a granule size distribution of at least 90% under 125 μm is obtained. Pellet presses or vibrating or ball mills, preferably of a refrigerated type, are used in the embrittlement stage and pinned disc or impact disc mills are used for the grinding stage.

DE-A 14 54 824 describes a process for the manufacture of granules or powders from fibrous, dry cellulose ethers by friction treatment between two rolls which run at different rotation speeds and subsequent grinding.

DE-A 30 32 778 refers to a two-stage process for the continuous homogenization of moist cellulose ethers in which the moist cellulose ethers are subjected to a cutting, impact-type and shearing action produced by orbiting rotating bodies with different cylindrical surface profiles, possibly simultaneous pelletization of the comminuted cellulose ethers with the addition of water and finally drying of the resulting pellets.

The known processes according to the state of the art are mostly of a multi-stage nature with pre-drying or pre-embrittlement or compaction and require extensive support equipment, e.g. intensive cooling. Furthermore, for all processes the thermo-mechanical stresses imposed upon the macro-molecules—and especially so when processing highly viscous, highly substituted products—are always so high that the macro-molecules are degraded by the reduction of chain length during grinding as can be seen from the more or less substantial reduction in viscosity when compared with the starting products. Furthermore, the surfaces of the products being processed are hardened by pre-embrittlement and pre-drying steps which can be seen to have a detrimental effect upon the required properties of rapid and complete solubility.

The object of the invention is to so further the development of the known processes and devices for the coarse grinding of cellulose in cutting mills that the ground cellulose powder suffers only a very small reduction in viscosity (=DP) when compared with the viscosity (=DP) of the starting product and that the temperature of the grinding device is lowered during the grinding operation.

SUMMARY OF ADVANTAGEOUS EMBODIMENTS OF THE INVENTION

This object is realized according to the invention by feeding the raw cellulose material in the form of a cellulose web continuously at controllable constant speed to a grinding unit and by so measuring the amount of liquid that the dry weight content of the moistened raw cellulose material amounts to 70 to 95% by weight and that the tensile strength of the cellulose web is retained.

The further development of the process is to be found in the claims 2 to 4.

The device according to the invention for carrying out the process is characterized by a moisturizing unit, a grinding unit, a first conveying mechanism which conveys the raw cellulose material to the moisturizing unit, a second conveying mechanism which conveys the moistened raw cellulose material from the moisturizing unit to the grinding unit and a sieve unit where each of the first and second conveying mechanisms comprise one or more rolls and one or more of the rolls is/are connected to a controllable drive.

Further details of the device are to be found in the claims 6 to 9.

The ground cellulose according to the process has a limiting viscosity number LVN of 90 to 97% of the value of the limiting viscosity of the unground cellulose.

The invention allows the advantages to be gained that the cellulose to be comminuted is exposed to only small levels of thermal-mechanical stress so that the degree of polymerization DP is reduced by only a small extent and that the comminuting device is sufficiently cooled with the result that condensation of the moistening liquid in the comminuting device is largely avoided.

There follows a more detailed explanation of the invention which refers to exemplary embodiments supported by diagrams.

BRIEF DESCRIPTION OF THE FIGS.

DETAILED DESCRIPTION OF ADVANTAGEOUS EMBODIMENTS OF THE INVENTION

Figure 1:
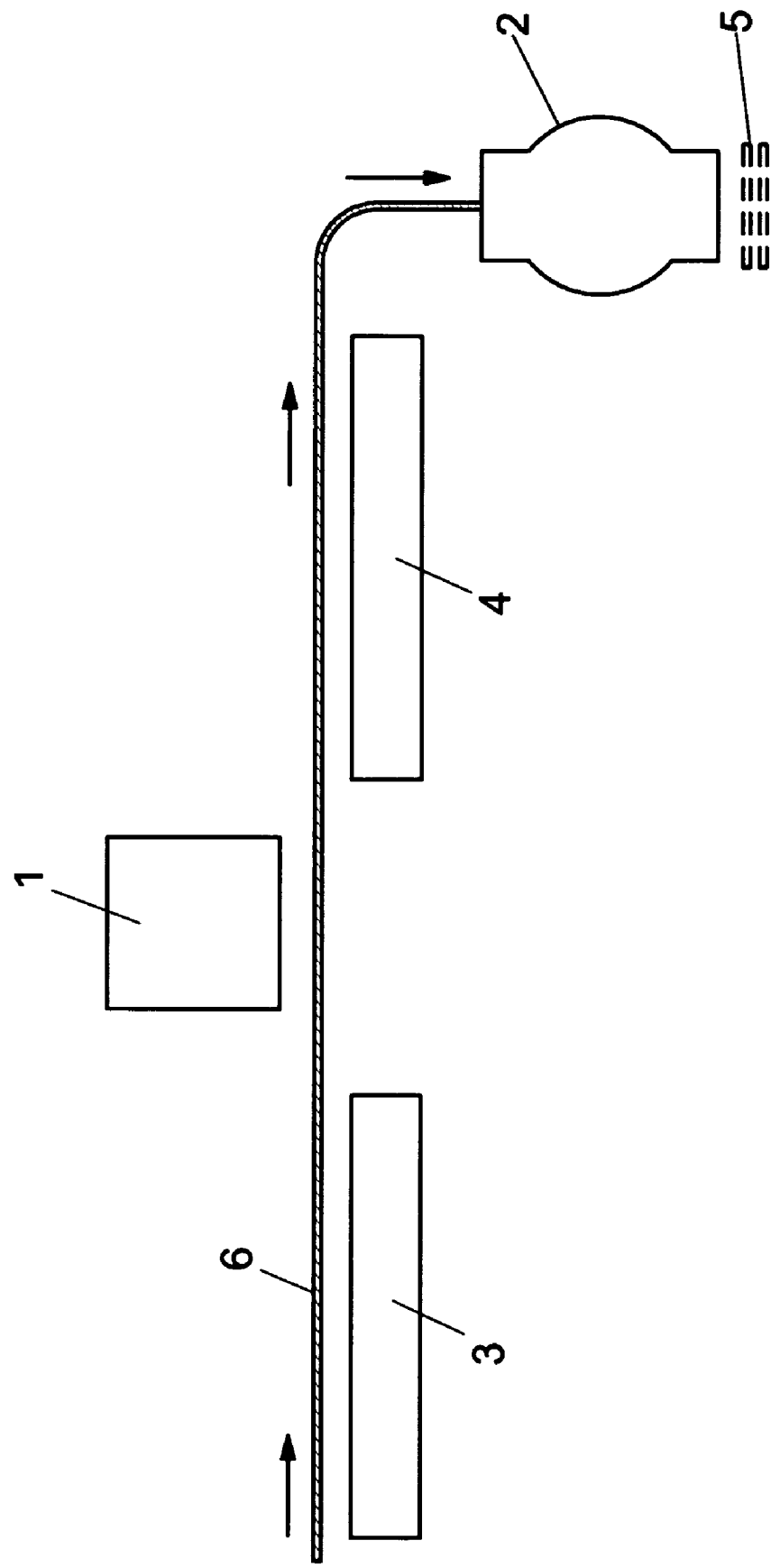
FIG. 1 shows a block diagram of a device according to the invention.

As shown in FIG. 1, a raw cellulose material 6 existing in the form of webs, individual units or in bulk is conveyed by means of a conveying mechanism 3 to a moistening unit 1 where a liquid is applied. The moistened raw cellulose material is conveyed by a second conveying mechanism 4 to a grinding unit 2. The cellulose web is mechanically reduced to small fragments in the grinding unit 2 where to some extent the heat energy produced by the grinding operation is dissipated by evaporative cooling—not shown in FIG. 1. Above all else the fibers present in the cellulose web are released by the grinding in such a way that their original fiber length is essentially preserved which means that the fibers are not cut into pieces. By means of a sieve unit 5 a desired distribution of fiber lengths of less than 700 μm is separated out of the ground cellulose.

Figure 2:
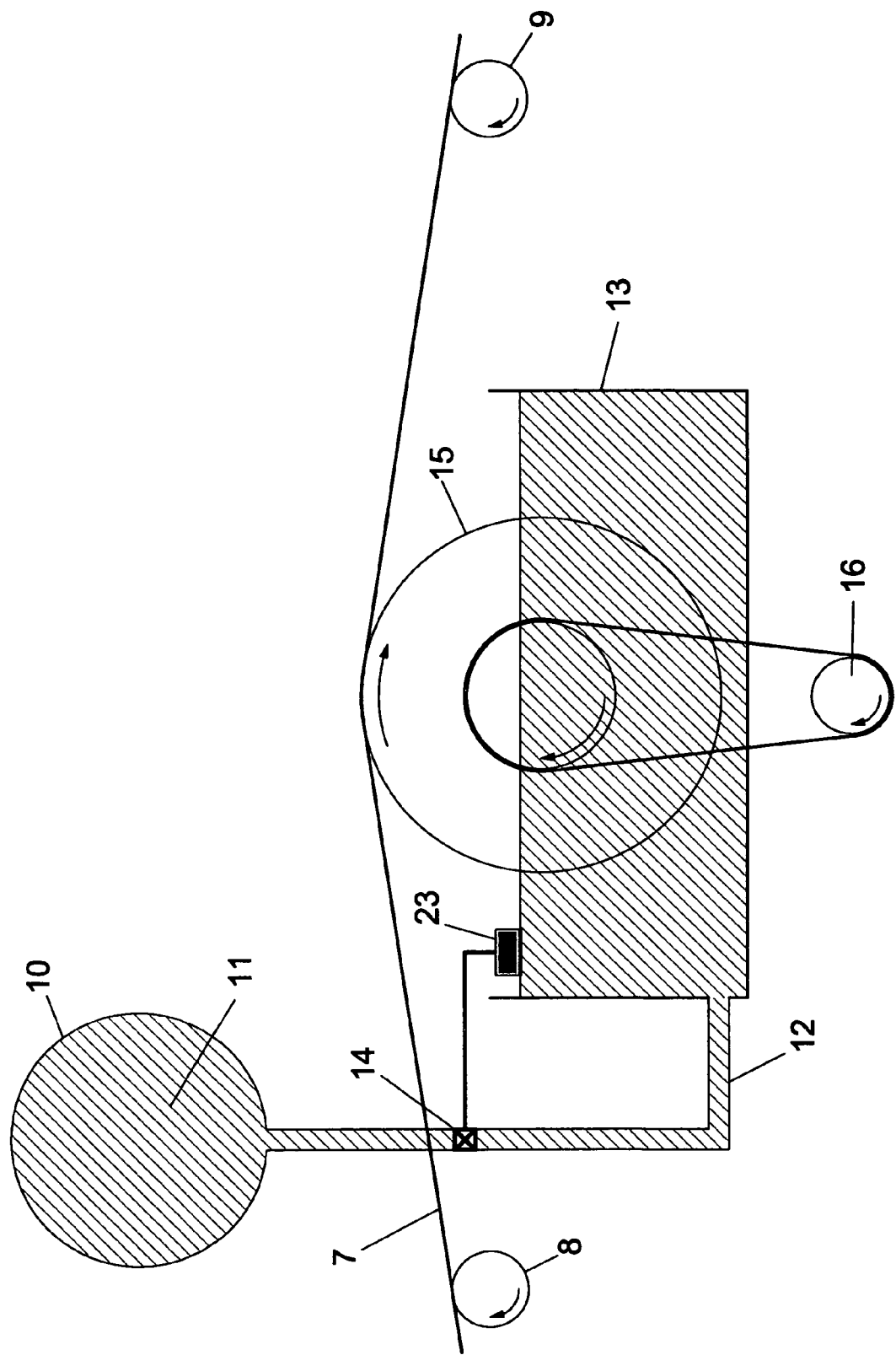
FIG. 2 shows a schematic section of a roll-type moistening unit of the device referred to in FIG. 1.

FIG. 2 provides a schematic illustration of a first exemplary embodiment of a roll-type moistening unit for raw cellulose material 6 which exists in the form of a cellulose web 7. A moistening liquid 11 is conveyed from a bath 13 to the cellulose web 7 by a driven moistening roll 15. The moistening roll 15 is aligned at right angles to the cellulose web 7 and it contacts the cellulose web along a line on the cylindrical surface of the roll running parallel to the axis. 30 to 80% of the cylindrical surface of the moistening roll is submerged in the moistening liquid 11. The rotation speed of the moistening roll 15 is controlled by a drive 16. Depending upon the speed of rotation of the moistening roll 15 a greater or lesser amount of liquid is transferred per unit of time to the cylindrical surface of the moistening roll 15 as a film of liquid and the film of liquid is pressed or cast onto the cellulose web 7. Moistening liquid 11 flows from a storage vessel 10 which is connected to the bath 13 via a pipe 12 into the bath 13. The flow rate is determined by the opening of a valve 14 which is connected to a sensor (e.g. a float) which continuously measures the level of the liquid in the bath 13. If the level of the liquid falls, the valve opens. Conversely, the valve is closed if the level of the liquid reaches or exceeds a pre-determined desired height. In this way the level of the liquid in the bath 13 is maintained at the desired height with the result that the transferred amount of liquid is controlled in dependence upon the speed of rotation of the moistening roll 15.

Figure 3:
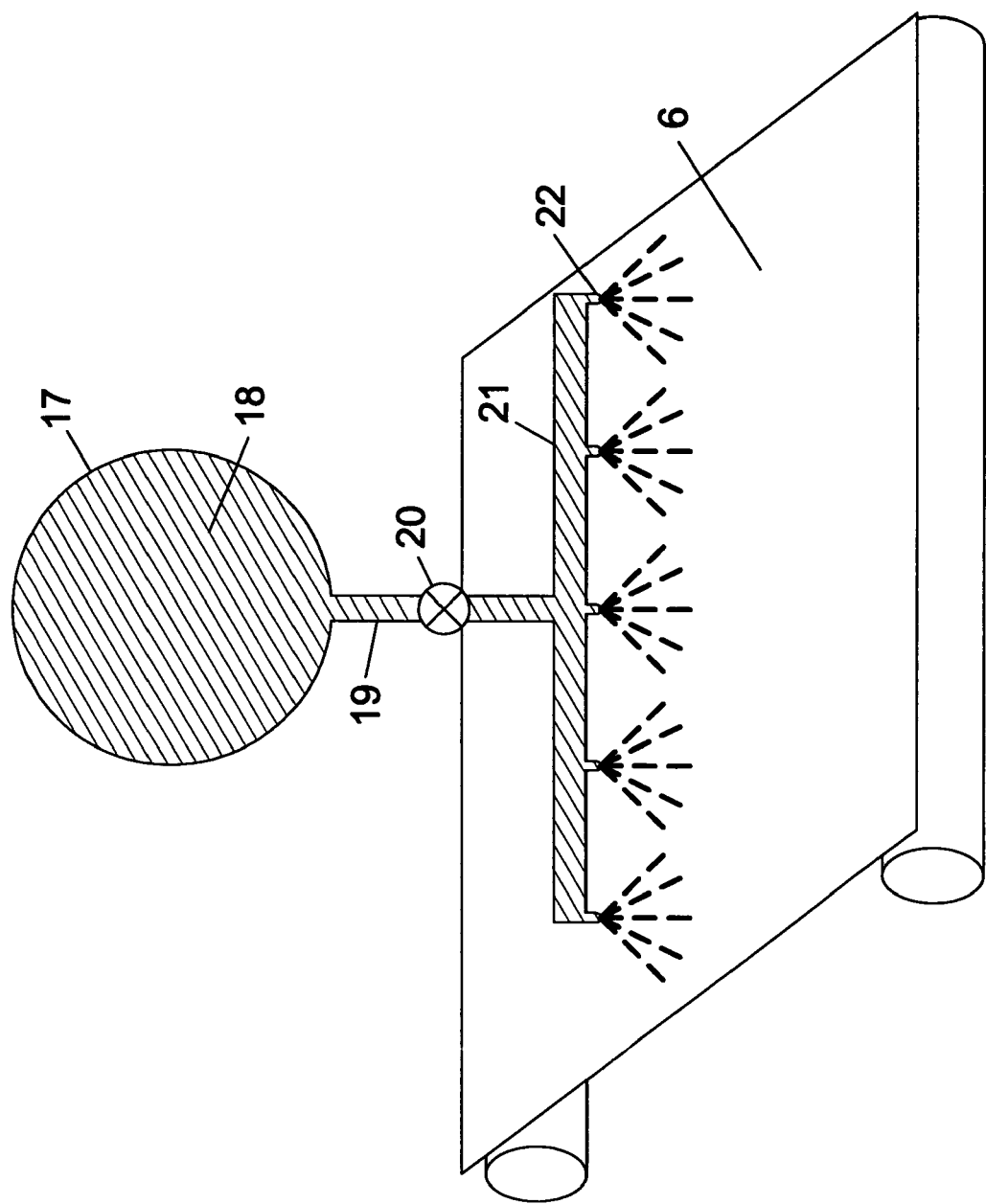
FIG. 3 shows a schematic section of a nozzle-type moistening unit of the device referred to in FIG. 1.

FIG. 3 shows a second exemplary embodiment of the moistening unit 1. Several nozzles 22 are arranged equidistantly along a distribution pipe 21. The distribution pipe 21 is arranged at right angles to the supply direction of the raw cellulose material 6. The moistening liquid 18 is sprayed onto the raw cellulose material through the nozzles 22. The distribution pipe 21 is connected to a storage vessel 17 by a main pipe 19. The flow from the storage vessel 17 to the distribution pipe 21 and the nozzles 22 is regulated by a valve 20 in the main pipe 19, i.e. the amount of liquid with which the raw cellulose material is moistened can be adjusted as desired. As was the case for the first exemplary embodiment, first consideration is given to water as the moistening liquid.

Figure 4:
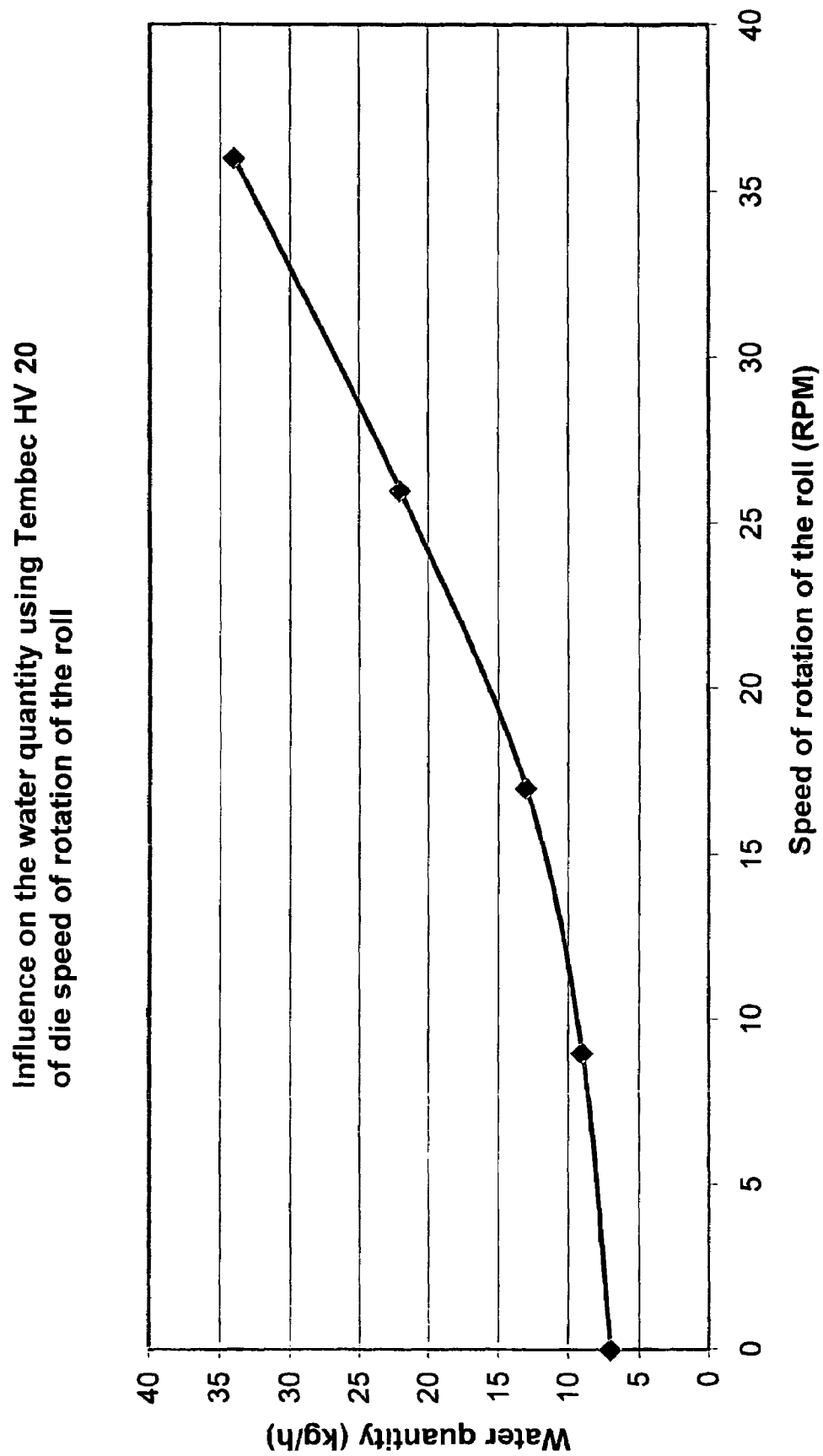
FIG. 4-6 show diagrams relating to the connection between added amounts of water and limiting viscosity number LVN in each case in dependence upon the rotation speed of the rolls.

FIG. 4 shows the connection between the speed of rotation of the roll and the transferred amount of water based upon the example of a cellulose web consisting of the chemical pulp Tembec HV 20. The amount of liquid transferred is determined by the speed of rotation of the roll. This involves limiting the amount of water to such an extent that the cellulose web does not break. If in fact too much liquid is added the tensile strength of the cellulose web is not preserved, i.e. it drops so much that the cellulose web breaks.

Figure 5:
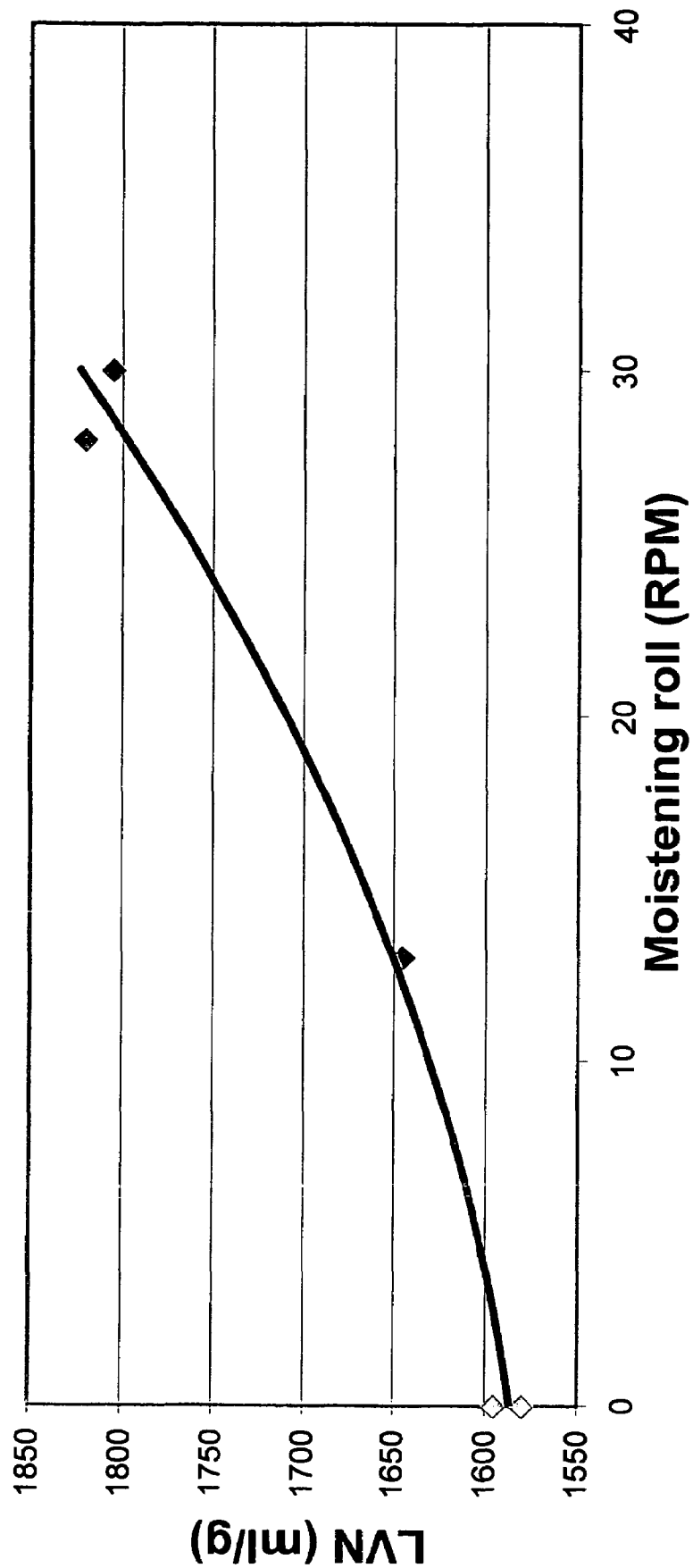

In FIG. 5 the limiting viscosity number LVN in the example of ground linters of the type Celucot 1058 is shown as a function of the amount of water added before the grinding operation or in terms of the speed of rotation of the moistening roll. A limiting viscosity number LVN of 2003 ml/g was measured prior to the grinding operation for the Celucot 1058 linters which were delivered with a natural very low moisture content. Conventional dry grinding (roll rotation speed=0) reduced the limiting viscosity number LVN to below 1600 ml/g). Compared with this a high rate of addition of water (30 RPM) resulted in a limiting viscosity number LVN of 1800 ml/g, i.e. the reduction of the limiting viscosity number LVN by the grinding operation was significantly moderated.

Figure 6:
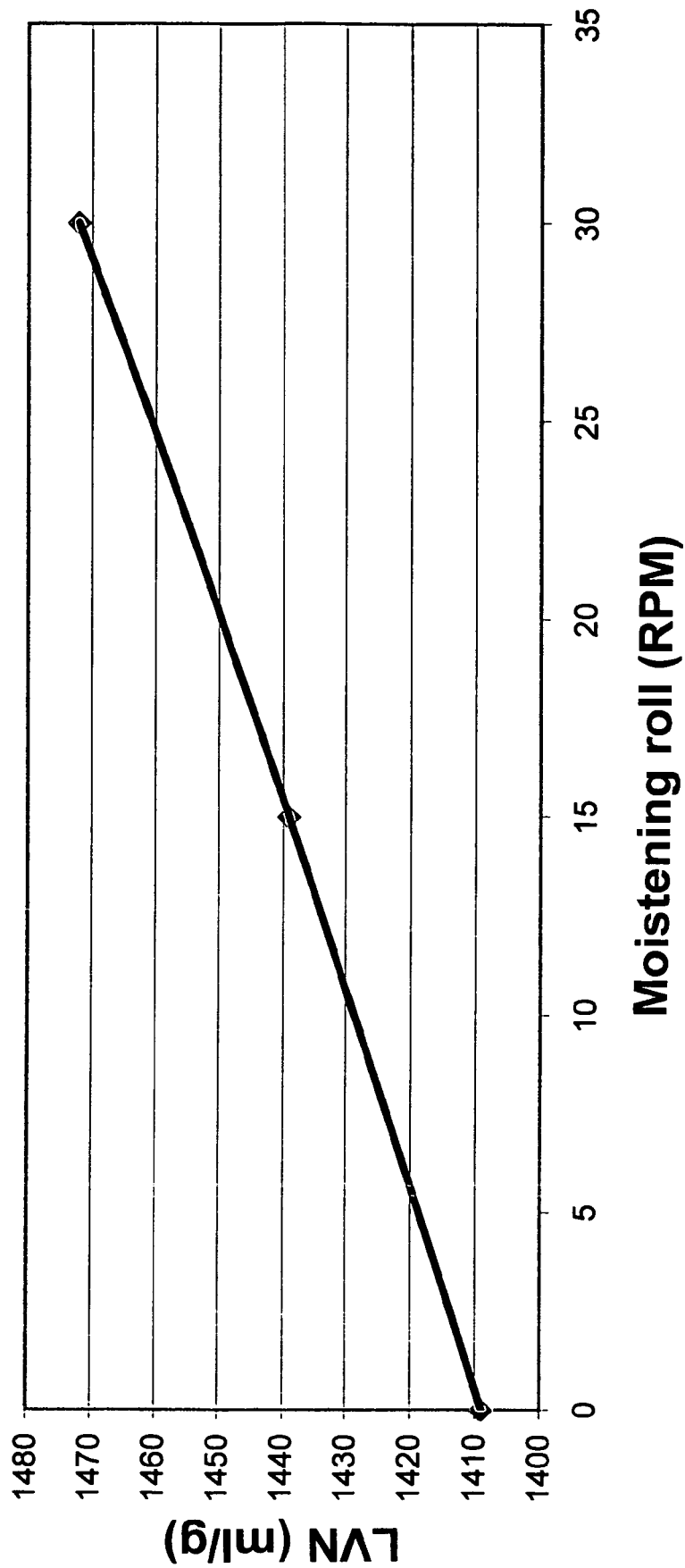

Analogous to FIG. 5, FIG. 6 shows the limiting viscosity number LVN of ground Tembec HV 20 chemical pulp according to the invention as a function of the amount of water added or the speed of rotation of the moistening roll prior to the grinding operation. The LVN of the natural Tembec HV 20 amounted to 1518 ml/g. Conventional dry grinding reduced the LVN to 1410 ml/g.

This value is to be compared with the 1473 ml/g obtained after a high rate of addition of water (30 RPM) and shows a similarly significantly lower reduction in the limiting viscosity number of the cellulose.

Two methods are described above for the moistening of raw cellulose material, namely the spraying of a liquid onto the passing raw cellulose material and the "pressing" of a cellulose web with water using a moistening roll.

In that context it is to be noted that the tensile strength of the cellulose web must be preserved as only in that case is it possible to guarantee trouble-free feeding into the mill and the grinding operation, particularly when the web is cut in a knife mill.

In the course of preliminary trials it was possible to determine that the tensile strength of the cellulose web is dependent upon the time available for the water to take effect and upon the quantity of the water. Effect-times clearly greater than 20 seconds lead to an homogenous distribution of the moisture throughout the thickness of the web and, consequently, to reduced tensile strength. Similarly a moisture content of more than 30% also results in a significant loss of tensile strength. In addition an inhomogeneous distribution across the width of the web is to be avoided because otherwise the web can break. It is, therefore, necessary to develop a method by which between 5 and 30 liters of water per hour can be applied in a rapid and homogeneous manner to the cellulose web which has a width of 70 to 80 cm. Measured in terms of cubic centimeters of water per second homogeneous spraying across the width of the web calls for more extensive equipment than the "pressing" alternative.

The device according to the invention is advantageously located between an unwind roll station and the cellulose in-draw rolls of a knife mill. The device comprises a chromed moistening roll driven by a regulating drive where some 30 to 80% of the cylindrical surface of the roll is submerged in water. In order to guarantee that the cellulose web is guided correctly the web is additionally led over both an entry and an exit guide roll which are not illustrated. The water level in the bath is maintained at a constant level by a float valve.

The cellulose web is deliberately pressed against the moistening roll by the guide rolls. By altering the rotation speed of the moistening roll it is possible to change the dry weight content of the Tembec HV 20 cellulose web in a reliable manner between 95% (RPM 0=the original moisture content of the cellulose as delivered) and 81% (RPM 30). The in-feed speed of the cellulose web in the present example lies within the range 3.2 to 3.6 m/min. and is, in particular, 3.4 m/min. However, depending upon the technical design of the mill, it is possible to use other in-feed speeds when the amount of water to be transferred, i.e. the rotation speed of the roll, is to be appropriately adjusted in order to maintain the desired moisture content of the web.

In the case of linters, for the same rotation speed of the moistening roll the amount of water to be made available is 107.8% of that for Tembec HV 20 because the width of the webs in this example is 75.5 cm rather than 70 cm.

The linters were subjected to five grinding treatments after being moistened. The mill used was a cutting mill with an open rotor and eight knives together with a 0.3 mm screen.

The mill was heated for about half an hour by dry grinding at a web speed of 3.4 m/min after which by engagement of the moistening roll a prescribed amount of water was applied to the web. A stable temperature was established after 2 hours. At this time a sample of the cellulose was taken through the appropriate pneumatic discharge pipe.

The progress of the temperature in the pneumatic discharge pipe was recorded in order to identify the time when a stable temperature was reached. The moisture content of the ground pulp was determined together with the limiting viscosity number LVN.

FIG. 5 clearly shows that with increasing RPM of the moistening roll, i.e. with increasing moisture content in the cellulose web, there is a rise in the limiting viscosity number LVN. The original cellulose had a limiting viscosity number LVN of 2003 ml/g. Adding moisture led to a reduction in the decrease of the LVN from 1590 ml/g (roll RPM=0) to 1810 ml/g at a roll rotation speed of 30 per minute. At this rotation speed the dry weight content in the cellulose web amounted to 83.5%. The temperature of the discharged cooling air was reduced from 100° C. to below 70° C. The dry weight content of the ground linters is 96.4%, while without moistening a value of 97.8% was measured.

Comparable grinding operations were carried out with Tembec HV 20. The results display the same tendency as found for the linters. Moistening results in a reduction of the degradation of cellulose during grinding. However, the effects are clearly lower in this instance as can be seen from FIG. 6. This can mostly be attributed to the fact that under the same grinding conditions coniferous cellulose can be ground considerably more easily than linters. Without moistening, the temperature of the cooling air reached a maximum of 85° C. instead of 100° C. With moistening, the cooling air amounted to some 60° C. For this reason the lessening of the degradation of the LVN cannot be so pronounced as with linters. For an LVN of the starting cellulose of 1518 ml/g and an in-feed speed of 3.4 m/min degradation resulted in a value of 1410 ml/g. Consequently, the reduction in the level of the decrease of the LVN cannot be so pronounced as for linters. Nevertheless, with maximal moistening an LVN of 1473 ml/g is measured. The added water evaporates in the interior of the mill and increases the moisture content of the discharged air. A calculation was made to estimate whether or not condensation could develop in the pulp cyclone if the temperature fell below the dew point, a situation which in itself is undesirable.

The following data were used for the calculation: the dry weight content of the cellulose is reduced by the moistening from 95% to 81.5% (with respect to the total weight of the cellulose). A dry weight content is measured in the ground cellulose of 96.4%. 28 kg of water per hour are available for evaporation. The ventilating fan draws 7200 $m^3$/h of air at about 20° C. and a (relative) humidity of 70% through 3 mills so that each mill receives 2400 $m^3$/h of air. 2400 $m^3$ of air at 20° C. can take up 42.7 kg of water. 2400 $m^3$ of air at 39° C. can take up 115.5 kg of water so that 72.8 kg of water can be dried out even if the in-drawn air is at 100% humidity. Condensation would take place on the walls of the cyclone at temperatures below 28° C. Provided the temperatures in the cyclone are higher than 28° C. no condensation will occur.

By way of summary it can be stated that both with linters Celucot 1058 and also with coniferous chemical wood-pulp Tembec HV 20 a clear reduction of the temperature of the air used to cool the mill is measured, this being dependent upon the amount of water added. At the same time, a comparable increase in limiting viscosity number LVN can be measured. These effects are particularly evident for linters. While in the case of the conventional grinding methods without moistening only 79% of the initial limiting viscosity number is retained, the addition of water allows this to be increased to 90%. Problems associated with temperatures below the dew point do not arise in the pulp cyclone provided the wall temperature of the cyclone lies above 35° C.

The invention claimed is:

1. A process for grinding cellulose comprising feeding raw cellulose material in the form of a cellulose web continuously at a controllable constant speed to a grinding unit and uniformly moistening the raw cellulose material with a prescribed amount of liquid prior to grinding wherein the amount of liquid is so measured that the dry weight content of the moistened raw cellulose material amounts to 70 to 95 % by weight and the tensile strength of the cellulose web is retained, and the grinding of the cellulose comprises cutting and the cellulose is cooled by a stream of gas during the grinding operation.

2. The process as claimed in claim 1, wherein the liquid for moistening the raw cellulose material is water which evaporates during the grinding and cools the cellulose.

3. The process as claimed in claim 1, wherein the ground cellulose has a limiting viscosity number LVN of 90 to 97 % of the value of the limiting viscosity number of the unground cellulose.

4. A process as claimed in claim 1, wherein said process comprises grinding cellulose material into individual fibers and said process preserves the original fiber length of the raw cellulose material.

5. A process according to claim 1, said process further comprising setting the controllable constant speed so that less than 20 seconds elapses between moistening and grinding.

6. A process according to claim 1, wherein the ground cellulose is fed to a pulp cyclone and the walls of the pulp cyclone are kept higher than 28° C. for coniferous cellulose and higher than 35° C. for linters.

7. A device for carrying out the process as claimed in claim 1, which comprises a moistening unit, a grinding unit, a grinding unit ventilating fan, a first conveying mechanism which conveys the raw cellulose material to the moistening unit, a second conveying mechanism which conveys the moistened raw cellulose material from the moistening unit to the grinding unit and a sieve unit wherein each of the first and second conveying mechanisms comprise one or more rolls and one or more of the rolls is/are connected to a controllable drive.

8. The device as claimed in claim 7, wherein the moistening unit consists of:

(a) a storage vessel for the liquid with which the cellulose web is moistened, (b) a bath which is connected to the storage vessel by a pipe, (c) a valve controlled by a level device which controls the flow of the liquid into the bath and which maintains the level of liquid at a particular constant height, (d) a driven moistening roll the length of which is equal to or longer than the width of the cellulose web to be ground and which is aligned across the cellulose web, where 30 to 80 % of the cylindrical surface of the roll is submerged in the liquid and where the upper part of the moistening roll contacts and moistens the cellulose web along a line parallel to its longitudinal axis, and (e) a drive by means of which the rotational speed of the moistening roll and also at the same time the amount of liquid transferred to the cellulose web can be controlled.

9. The device as claimed in claimed 7, which comprises:

(a) a storage vessel with a liquid for moistening the cellulose raw material, (b) a main pipe which is connected to the storage vessel, (c) a controllable valve in the main pipe to adjust the flow of the liquid, and (d) one or more nozzles arranged in a distribution pipe where the distribution pipe is connected to the main pipe.

10. The device as claimed in claim 7, wherein the grinding unit is a knife mill.

11. The device as claimed in claim 7, wherein the sieve unit is arranged at the discharge side of the grinding unit.

12. A device as claimed in claim 7, wherein said sieving unit separates out fibers having a length of less than 700 microns.

* * * * *